(12) United States Patent
Frantesová et al.

(10) Patent No.: US 12,524,032 B2
(45) Date of Patent: Jan. 13, 2026

(54) FLOOR MOUNTED PEDAL ASSEMBLY

(71) Applicant: KSR IP Holdings, LLC, Wilmington, DE (US)

(72) Inventors: Adéla Frantesová, Bruzovice (CZ); Wjatscheslaw Kauz, Pattensen (DE)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 18/210,281

(22) Filed: Jun. 15, 2023

(65) Prior Publication Data

US 2023/0409069 A1 Dec. 21, 2023

Related U.S. Application Data

(60) Provisional application No. 63/352,318, filed on Jun. 15, 2022.

(51) Int. Cl.
*G05G 1/44* (2008.04)
*G05G 1/46* (2008.04)

(52) U.S. Cl.
CPC ............... *G05G 1/44* (2013.01); *G05G 1/46* (2013.01)

(58) Field of Classification Search
None
See application file for complete search history.

(56) References Cited

U.S. PATENT DOCUMENTS

| | | |
|---|---|---|
| 7,717,012 B2 | 5/2010 | Kim et al. |
| 7,926,384 B2 | 4/2011 | Wurn |
| 8,161,842 B2 | 4/2012 | Kim et al. |
| 8,438,945 B2 | 5/2013 | Kim et al. |
| 8,635,930 B2 | 1/2014 | Willemsen et al. |
| 8,806,977 B2 | 8/2014 | Stewart et al. |
| 9,079,492 B2 | 7/2015 | Osawa et al. |
| 9,110,490 B2 | 8/2015 | O'Neill et al. |
| 9,244,481 B2 | 1/2016 | Stewart et al. |
| 9,283,845 B2 | 3/2016 | Inuzuka et al. |
| 9,671,815 B2 | 6/2017 | Fuller et al. |
| 10,248,152 B2 | 4/2019 | Kim et al. |
| 10,533,626 B2 | 1/2020 | Kita et al. |

(Continued)

FOREIGN PATENT DOCUMENTS

| | | | | |
|---|---|---|---|---|
| CN | 104272212 A | * | 1/2015 | ........... B60K 26/021 |
| DE | 102014106329 A1 | | 11/2015 | |

(Continued)

*Primary Examiner* — Vicky A Johnson
(74) *Attorney, Agent, or Firm* — Dinsmore & Shohl LLP

(57) ABSTRACT

Embodiments herein are directed to pedal assembly for a vehicle that includes a housing, a link member, a pedal arm, and a lever arm. The housing has a friction generating member extending from an interior surface of a sidewall. The pedal arm is coupled to a first end of the link member. The lever arm has a second lever end that includes a hub portion. A first lever end includes an attachment portion extending from an exterior surface. The attachment portion is coupled to the second end of the link member. The hub portion abuts the friction generating member of the housing and moves when a pressure is applied to the attachment portion. When the pedal arm is depressed, the lever arm leverages a load applied to the pedal arm to move the hub portion against the friction generating member of the housing thereby generating a hysteresis.

20 Claims, 10 Drawing Sheets

(56) References Cited

U.S. PATENT DOCUMENTS

| | | |
|---|---|---|
| 10,569,648 B2 | 2/2020 | Saito et al. |
| 10,739,810 B2 | 8/2020 | Nagashima et al. |
| 2007/0234842 A1* | 10/2007 | Elliott .................. G05G 1/38 74/513 |
| 2010/0139445 A1 | 6/2010 | Kim et al. |
| 2011/0197700 A1 | 8/2011 | O'Neill |
| 2018/0253120 A1 | 9/2018 | Kim et al. |
| 2019/0359055 A1 | 11/2019 | Park et al. |

FOREIGN PATENT DOCUMENTS

| | | |
|---|---|---|
| DE | 102008003296 A1 | 4/2016 |
| DE | 102009032664 A1 | 5/2016 |
| DE | 102015106479 A1 | 8/2017 |
| DE | 102018207422 A1 | 11/2018 |
| EP | 3031653 A1 | 6/2016 |
| JP | 2019101574 A | 6/2019 |
| KR | 101316145 B1 | 10/2013 |
| KR | 1020210023290 A | 3/2021 |

\* cited by examiner

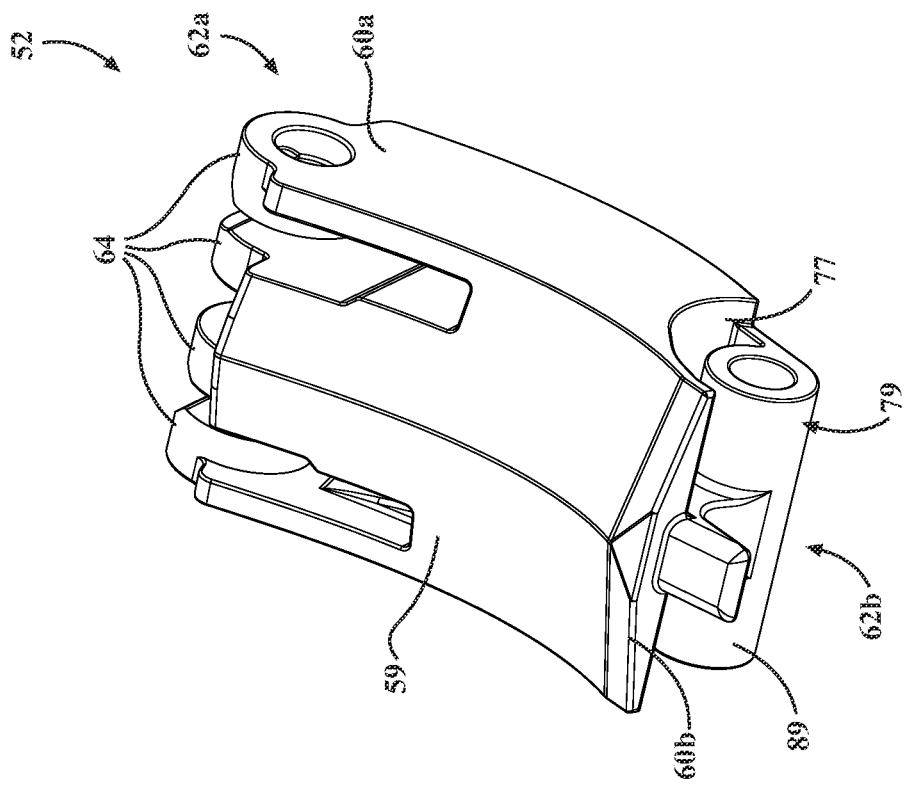
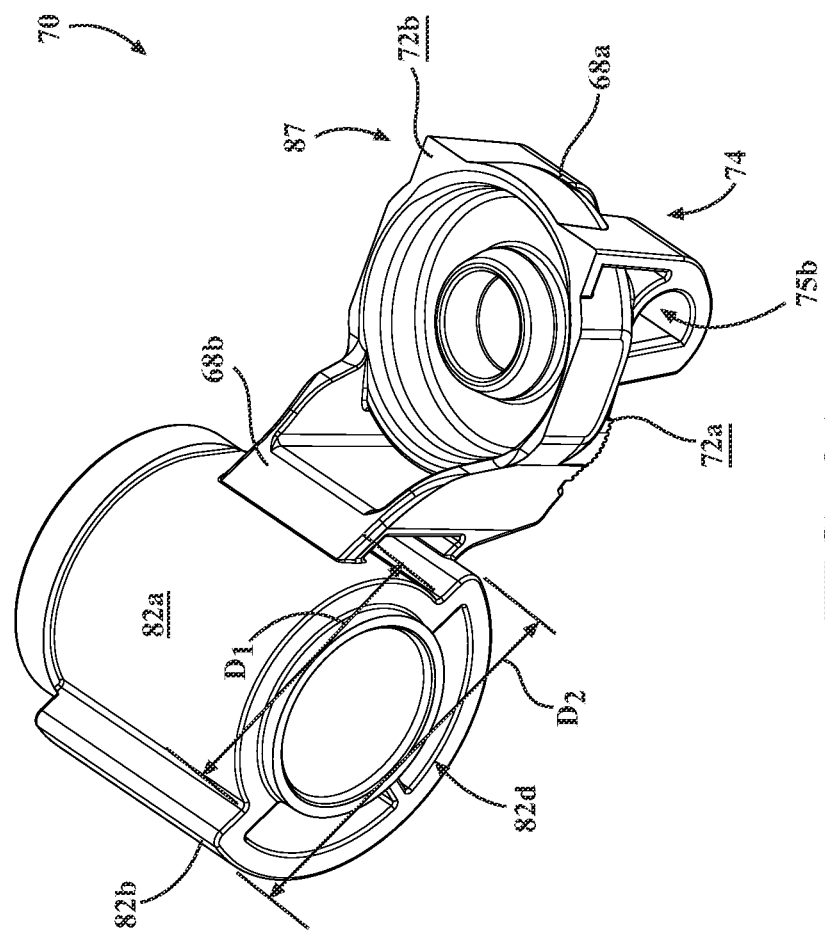
FIG. 9A
FIG. 9B

FLOOR MOUNTED PEDAL ASSEMBLY

CROSS-REFERENCE TO RELATED APPLICATIONS

This utility patent application claims priority benefit from U.S. Provisional Patent Application Ser. No. 63/352,318, filed Jun. 15, 2022, and titled "Floor Mounted Electronic Throttle Control Pedal Assembly", the contents of which are incorporated by reference in its entirety by reference.

TECHNICAL FIELD

The present specification generally relates to pedal assemblies for vehicles and, more specifically, to pedal assemblies that generate a hysteresis during pedal movement.

BACKGROUND

Floor mounted accelerator pedal assemblies are well known. In pedal assemblies, the accelerator pedal is coupled or in communication with a throttle, replacing mechanical linkage. Generally, accelerator pedal assemblies include an accelerator pedal module, a throttle valve that can be opened and closed by an electric motor, and a powertrain or engine control module that employs software to determine the required throttle position by calculations from data measured by other sensors. However, these known accelerator pedal assemblies are not constructed to provide position sensor output to the powertrain controller and a mechanical resistance with hysteresis to the driver's foot, both in relation to the position of the pedal.

SUMMARY

In one embodiment, a pedal assembly is provided. The pedal assembly includes a housing, a link member, a pedal arm, and a lever arm. The housing has a friction generating member extending from an interior surface of a sidewall. The link member has a first end and an opposite second end. The pedal arm is coupled to the first end of the link member. The lever arm has a first lever end and an opposite second lever end. The second lever end includes a hub portion. The first lever end includes an attachment portion extending from an exterior surface of the first lever end. The attachment portion is coupled to the second end of the link member. The hub portion abuts the friction generating member of the housing and moves when a pressure is applied to the attachment portion. When the pedal arm is depressed, the lever arm leverages a load applied to the pedal arm to move the hub portion against the friction generating member of the housing thereby generating a hysteresis.

In another embodiment, a floor mounted pedal assembly for a vehicle is provided. The floor mounted pedal assembly includes a housing, a link member, a pedal arm, a lever arm, and a spring carrier assembly. The housing has a friction generating member integrated with and extending from an interior surface of a sidewall. The friction generating member is arcuate in shape. The link member has a first end and an opposite second end. The pedal arm is coupled to the first end of the link member. The lever arm has a first lever end and an opposite second lever end. The second lever end includes a hub portion. The first lever end includes an attachment portion extending from an exterior surface of the first lever end such that the attachment portion is coupled to the second end of the link member. The hub portion abuts the friction generating member of the housing and moves when a pressure is applied to the attachment portion. The spring carrier assembly is positioned within the housing and includes a spring carrier that has a spring receiving portion and at least one spring extending between the lever arm and the spring carrier. When the pedal arm is depressed, the lever arm leverages a load applied to the pedal arm to move the hub portion against the friction generating member of the housing thereby generating a hysteresis.

In another embodiment, a pedal assembly is provided. The pedal assembly includes a housing, a link member, a pedal arm, and a lever arm. The housing has a friction generating member extending from an interior surface of a sidewall. The friction generating member is arcuate in shape. The link member has a first end and an opposite second end. The pedal arm is coupled to the first end of the link member. The lever arm has a first lever end and an opposite second lever end. The first lever end is coupled to the second end of the link member. The second lever end of the lever arm includes a hub portion. The hub portion includes a first surface and a second surface. The second surface extends from a portion of the first surface. The second surface is semi-circular in shape to correspond to the arcuate shape of the friction generating member. The second surface abuts the friction generating member of the housing and moves when a pressure is applied to the link member. When the pedal arm is depressed, the lever arm leverages a load applied to the pedal arm to move the second surface of the hub portion against the friction generating member of the housing thereby generating a hysteresis.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9A schematically depicts an isolated perspective bottom view of the lever arm of the pedal assembly of FIG. 1 according to one or more embodiments shown and described herein;

FIG. 9B schematically depicts an isolated perspective side and bottom view of the link member of the pedal assembly of FIG. 1 according to one or more embodiments shown and described herein.

DETAILED DESCRIPTION

Figure 1:
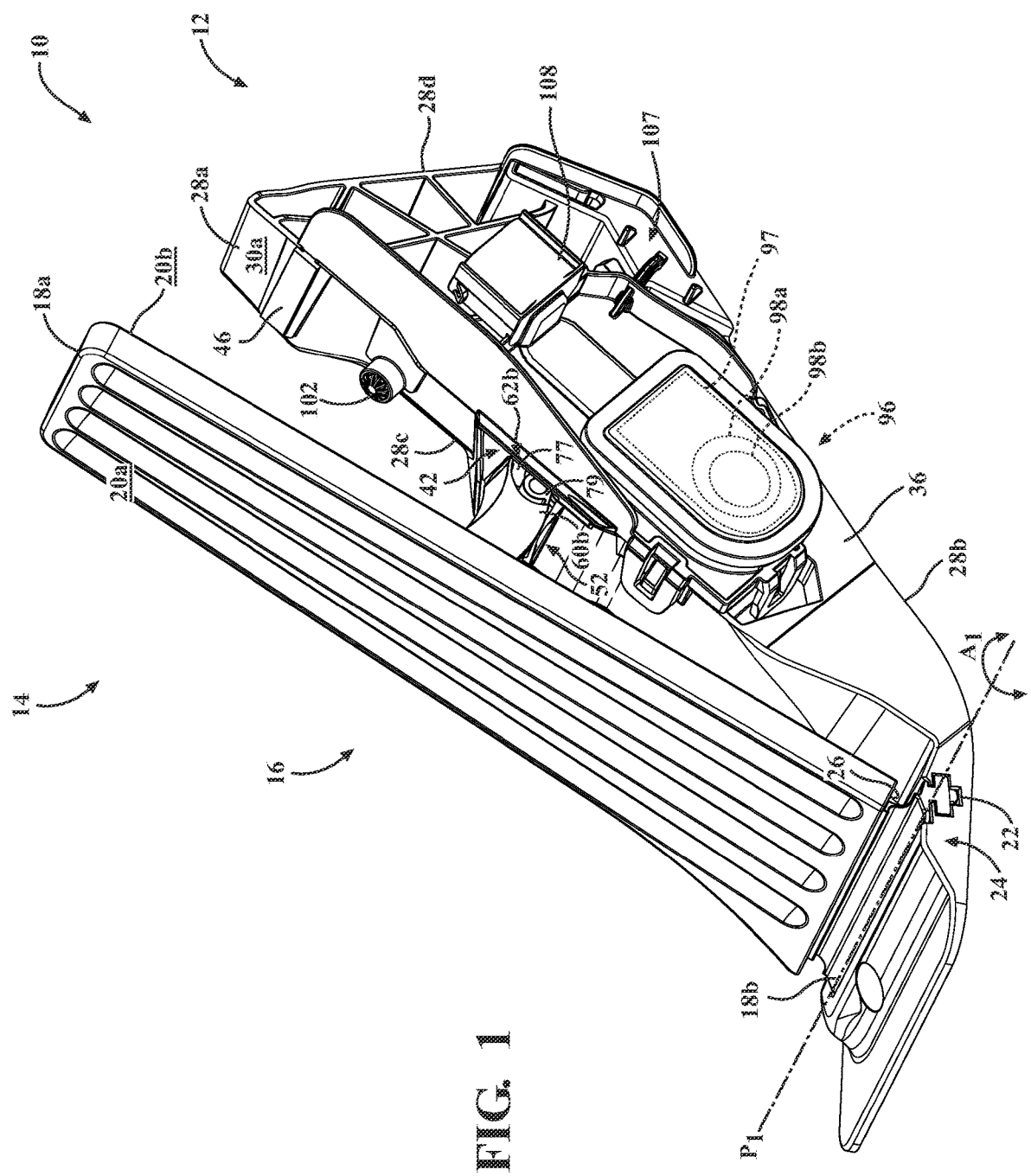
FIG. 1 schematically depicts a front and right side perspective view of a pedal assembly in a home position according to one or more embodiments shown and described herein.

Embodiments described herein are directed to a floor mounted organ type pedal assembly, such as an accelerator pedal assembly. The pedal assembly is configured to generate its own hysteresis within a housing using a hub portion of a lever arm that moves against a corresponding semicircular friction generating member that extends from an interior surface of a sidewall of the housing to generate hysteresis based on the amount of pivot of the pedal pad.

A sensor assembly is mounted to the housing with a connector extending from the housing and configured to communicatively couple the sensor assembly to an electronic control unit, a powertrain control unit, and/or the like. A coupler is mounted in the hub portion and is configured to rotate when the hub rotates. As such, the sensor assembly may track or determine the movement of the coupler via a transmitting coil and at least one receiving coil positioned on or within a circuit board, such as a printed circuit board. As such, the sensor assembly will sense the mount of force on the pedal pad at any given time based on the positon of the coupler.

Various embodiments of the pedal assembly are described in detail herein.

As used herein, the term "communicatively coupled" means that coupled components are capable of exchanging data signals with one another such as, for example, electrical signals via conductive medium or a non-conductive medium, though networks such as via Wi-Fi, Bluetooth, and the like, electromagnetic signals via air, optical signals via optical waveguides, and the like.

Referring initially to FIGS. 1-10, a pedal assembly 10 is schematically depicted. The pedal assembly 10 includes a housing 12 and a pedal arm assembly 14. The pedal arm assembly 14 includes a pedal arm 16, a link member 52, a spring carrier assembly 58, and a lever arm 66. The pedal arm 16 includes a pedal pad end 18a and a pivot end 18b. Further, the pedal arm 16 includes an exterior surface 20a and an opposite interior surface 20b spaced apart from the exterior surface 20a to define a thickness of the pedal arm 16. In some embodiments, the pedal arm 16 is generally planar shaped. In other embodiments, the pedal arm 16 may be differently shaped such as curvilinear, arcuate, and/or the like. The pivot end 18b is pivotally coupled to the housing 12 about a pivot axis P1 to move or pivot about the pivot axis P1, illustrated by the arrow A1 in FIG. 1. For example, in the depicted embodiments, the pivot end 18b slidably engages with a receiving slot 22 of the housing 12.

Figure 2:
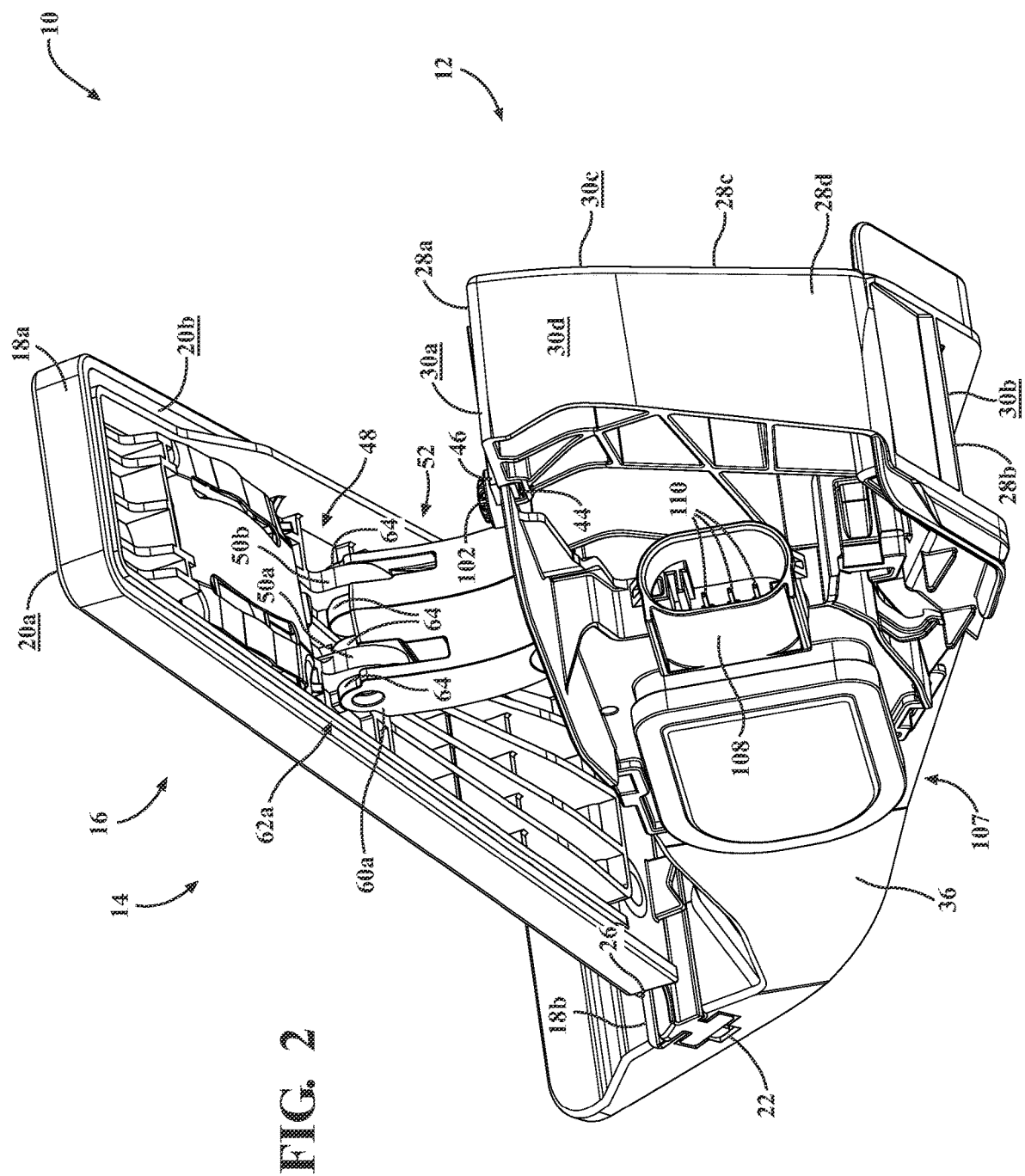
FIG. 2 schematically depicts a rear and right side perspective view of the pedal assembly of FIG. 1 according to one or more embodiments shown and described herein.
Figure 3:
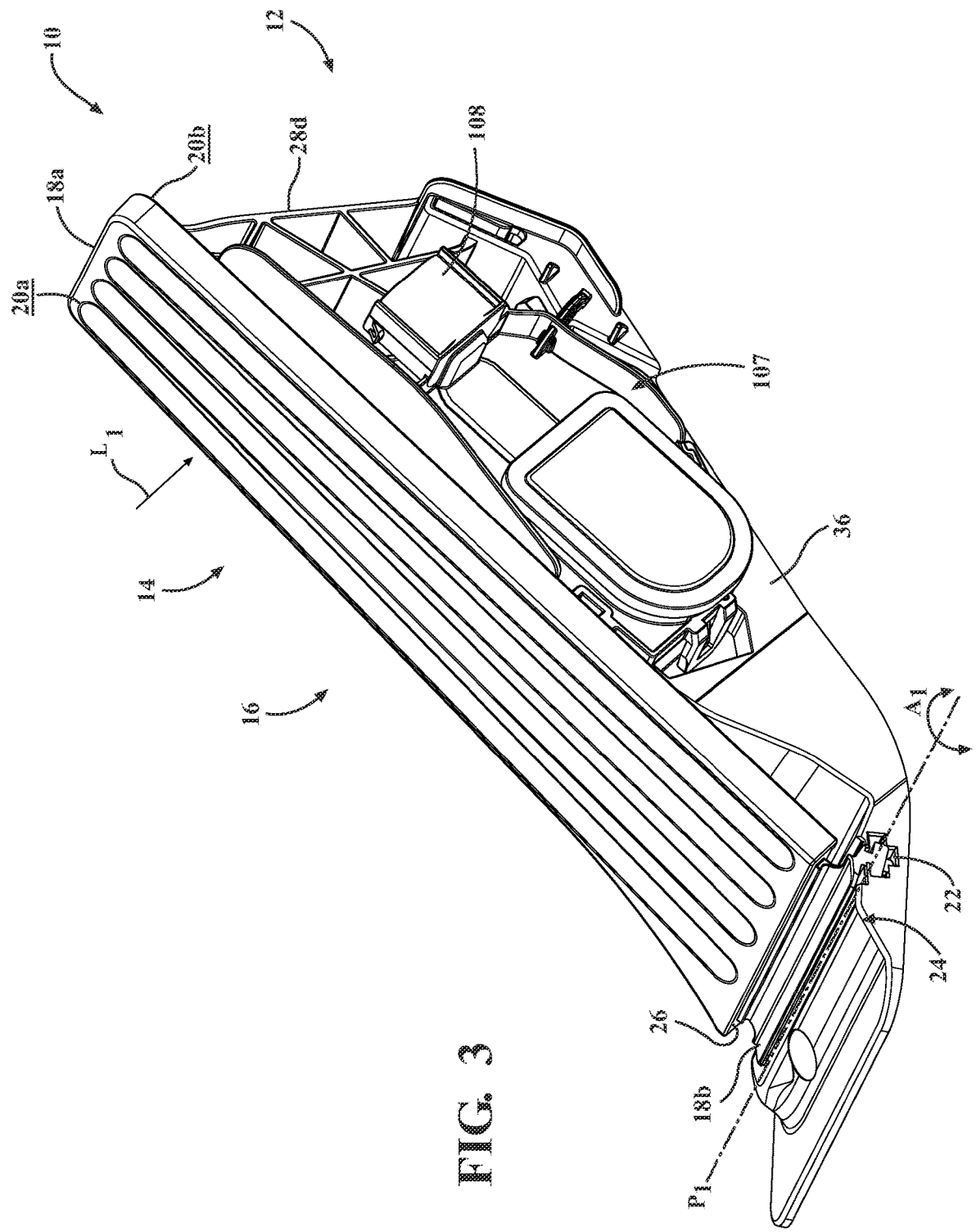
FIG. 3 schematically depicts a front and right side perspective view of the pedal assembly of FIG. 1 in a fully depressed position according to one or more embodiments shown and described herein.
Figure 4:
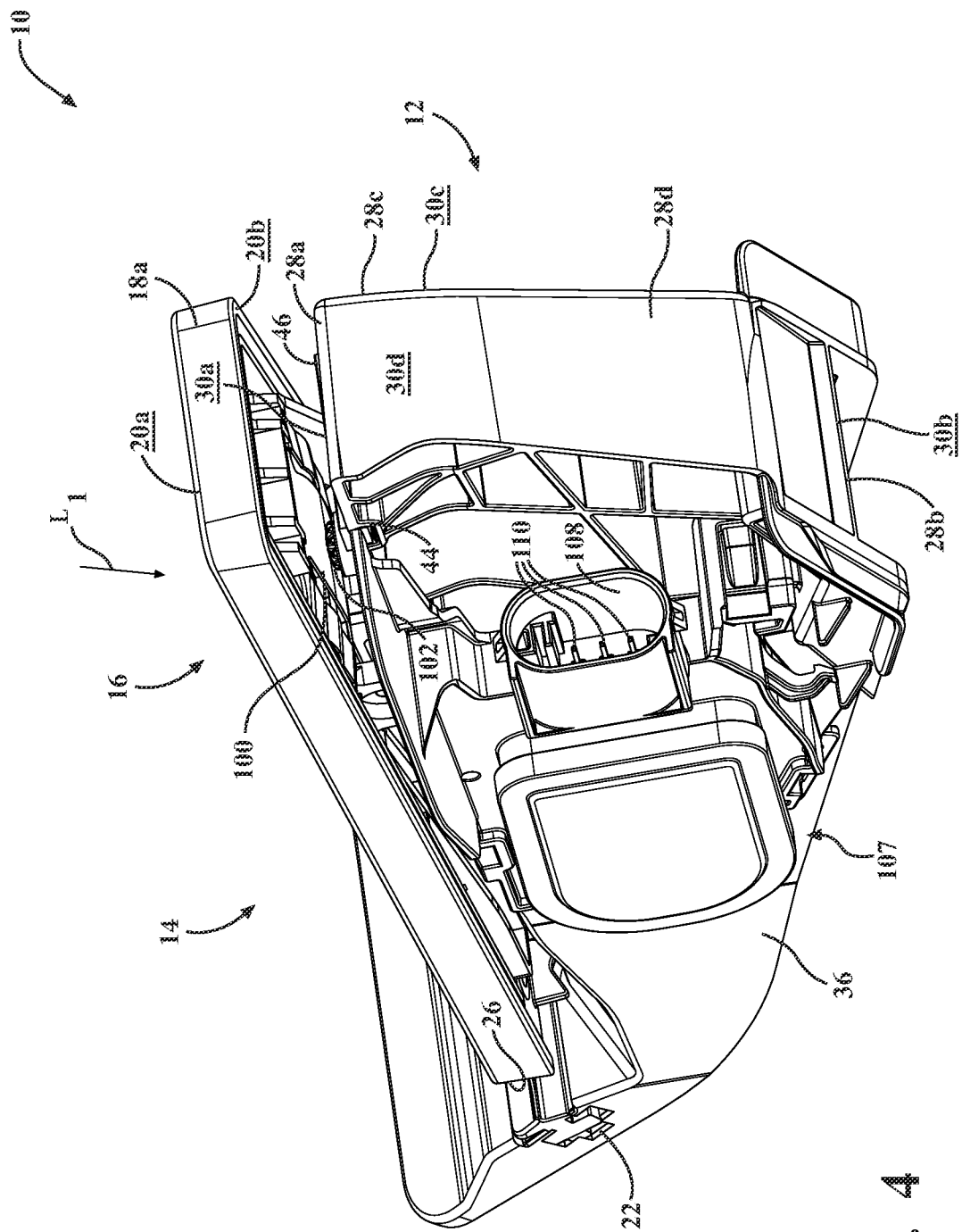
FIG. 4 schematically depicts a rear and right side perspective view of the pedal assembly of FIG. 3 according to one or more embodiments shown and described herein.
Figure 5:
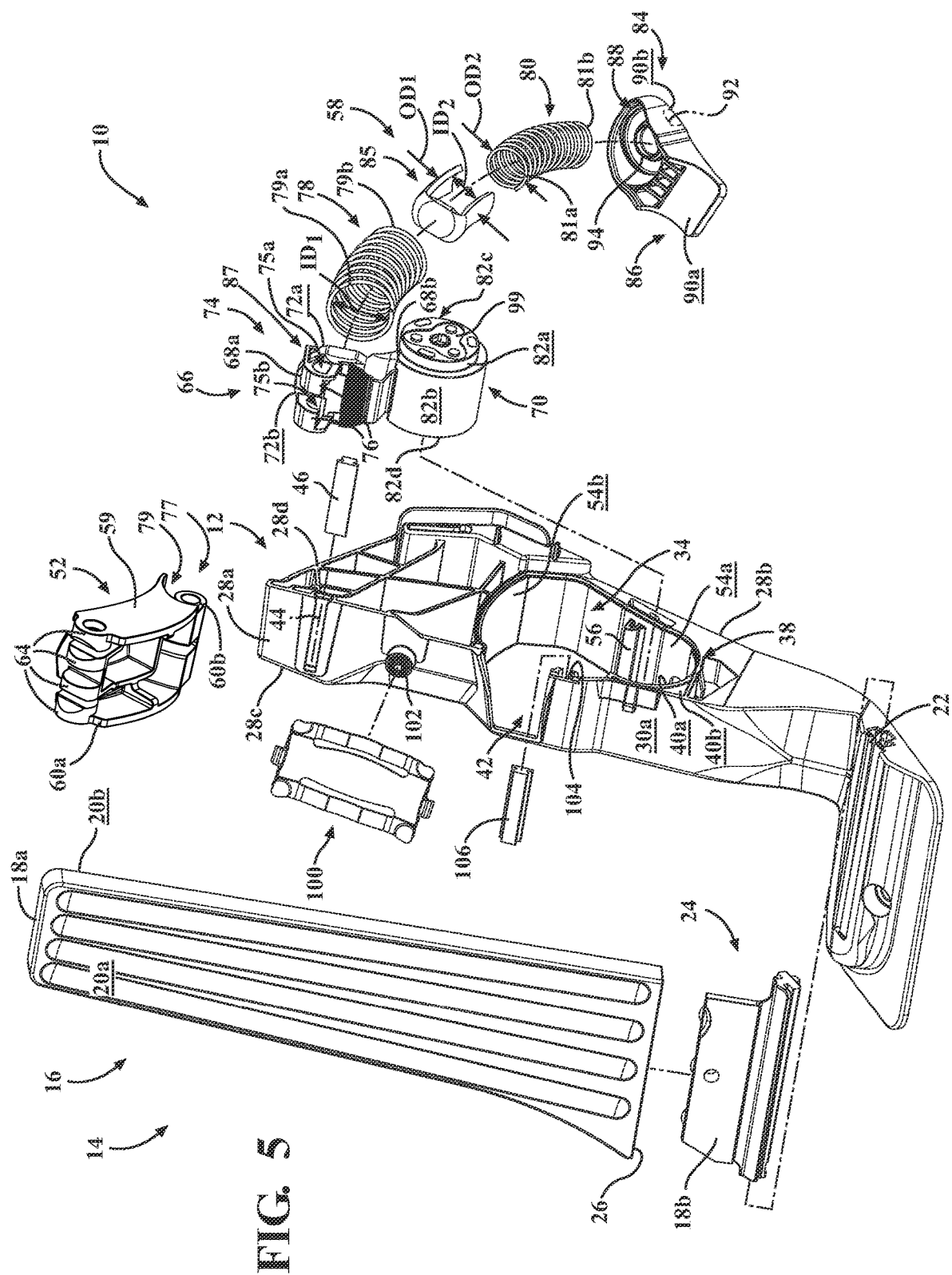
FIG. 5 schematically depicts an exploded view of the pedal assembly of FIG. 1 according to one or more embodiments shown and described herein.

In some embodiments, the pivot end 18b may be a plate 24 that is coupled to a distal end 26 of the pedal arm 16 via a fastener such as a screw, rivet, bolt and nut, press fit, epoxy, adhesive, weld, and/or the like. As such, the pivot end 18b may act as a living hinge to allow the pedal arm 16 to move between a home position, as best illustrated in FIGS. 1-2, to a fully depressed position, as best illustrated in FIGS. 3-4, and a plurality of depress positions therebetween about the pivot axis P1 in the directions illustrated by arrow A1.

Figure 10:
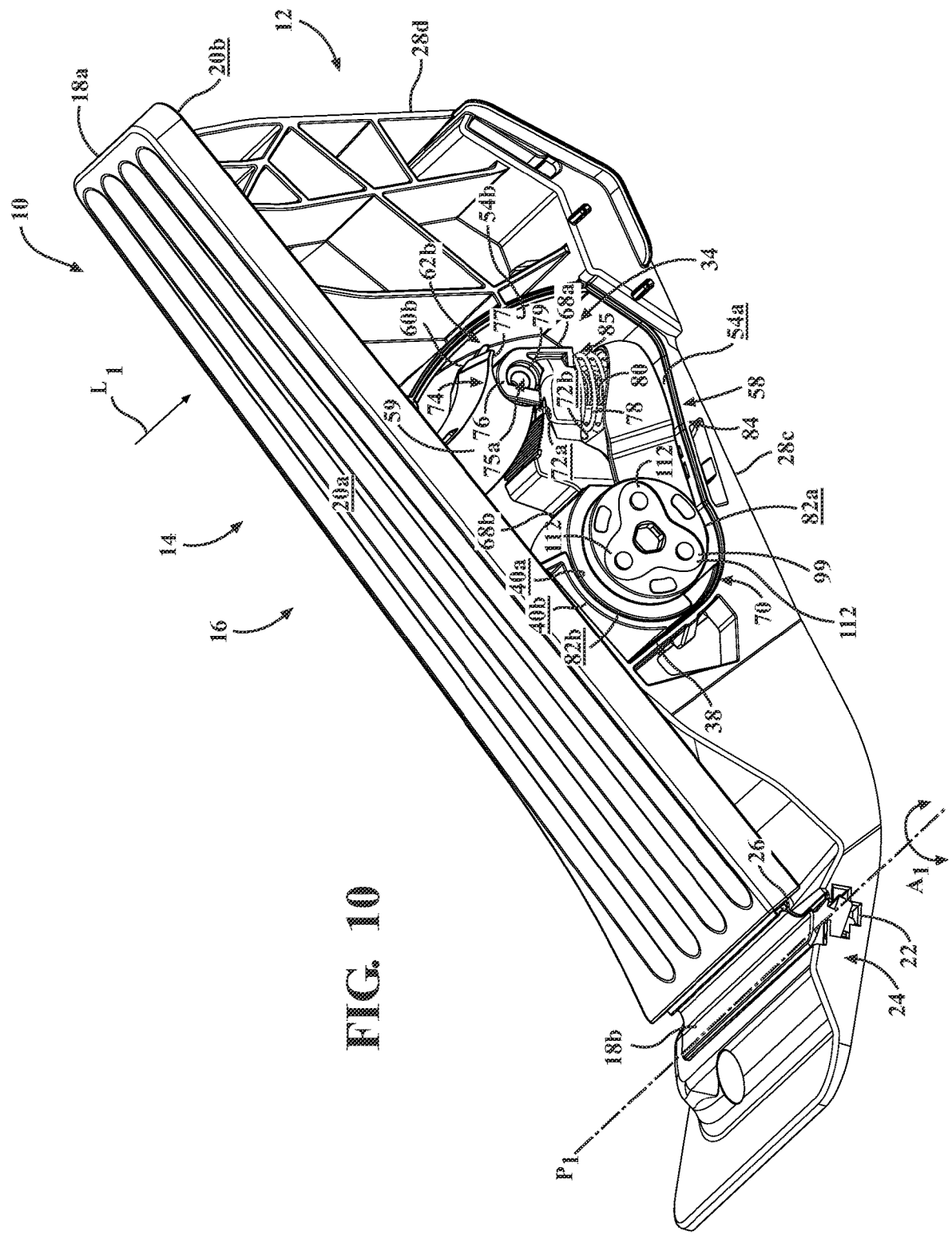
FIG. 10 schematically depicts a right side view of the pedal assembly of FIG. 3 with a connector assembly housing removed according to one or more embodiments shown and described herein.

In some embodiments, the pivot end 18b may generally be a T-shape as depicted and the receiving slot 22 may have a corresponding shape to receive the pivot end 18b and allow the pivot end 18b to move or pivot about the pivot axis P1 within the receiving slot 22, as best illustrated in FIG. 10. This is non-limiting and the pivot end 18b may be any shape, such as rectangular, square, hexagonal, octagonal, cylinder and the like. Further, the receiving slot 22 of the housing 12 may be any shape to correspond to the shape of the pivot end 18b to allow the pivot end 18b to pivot or move about the pivot axis P1, illustrated by the arrow A1 in FIG. 1. Further, in other embodiments, the pivot end 18b may be coupled to the housing 12 via a fastener, such as a screw, rivet, pin, dowel, bolt and nut, and/or the like. Further, in other embodiments, the distal end 26 may be directly coupled to the housing 12 via a fastener, such as a screw, rivet, pin, dowel, bolt and nut, and/or the like, to act as the pivot end and thus without the need for the plate 24.

The exterior surface 20a of the pedal arm 16 may be a pedal pad or may receive a pedal pad that a foot of a user would depress against to brake, accelerate, and/or activate a clutch control. The interior surface 20b include an attachment portion 48 and a plate spring 100 extending therefrom. The attachment portion 48 may include a pair of spaced apart flanges 50b that may include indentions and/or other mechanical devices and/or components to couple or attach the pedal arm 16 to a link member 52, as discussed in greater detail herein. The plate spring 100 may be configured to make contact or otherwise engage with portions of the housing 12 when the pedal arm is near and/or in the fully depressed position, as discussed in greater detail herein.

The housing 12 includes an upper wall 28a, an opposite lower wall 28b, a sidewall 28c extending therebetween, and an end wall 28d. Each of the upper wall 28a, the lower wall 28b, and the sidewall 28c have an outer surface 30a, 30b, 30c, 30d, respectively, and an opposite inner surface 32a, 32b, 32c, 32d, respectively, that define a cavity 34 between each inner surface 32a, 32b, 32c, 32d. A connector assembly housing 36 forms the opposite sidewall to enclose the cavity 34 when installed, as discussed in greater detail herein. A friction generating member 38 extends from the inner surface 32c of the sidewall 28c. In some embodiments, the friction generating member 38 is integrally formed with the inner surface 32c of the sidewall 28c as a one piece monolithic structure with the sidewall 28c. In other embodiments, the friction generating member 38 may be coupled to the inner surface 32c of the sidewall 28c via a fastener, such as, without limitation, screws, rivets, bolt and nuts, adhesive, epoxy, weld, and/or the like.

In some embodiments, the friction generating member 38 may include an interior surface 40a and an opposite exterior surface 40b. In some embodiments, the interior surface may have a smooth contour. In other embodiments, the interior surface 40a may include a liner or other material to form the smooth contour. The friction generating member 38 and/or the interior surface 40a thereof may be arcuate in shape. For example, the friction generating member 38 and/or the interior surface 40a thereof may be semi-circular, semi-annular, and the like. In other embodiments, the friction generating member 38 and/or the interior surface 40a thereof may be other shapes such as circular, hexagonal, octagonal, and/or the like. As such, in other embodiments, the friction generating member 38 and/or the interior surface 40a thereof may not be arcuate, or may include arcuate portions. Further, the friction generating member 38 may extend from the inner surface 32a and/or the inner surface 32c and may define a portion of the cavity 34.

Further, a guide member 49 extends from the inner surface 32c of the sidewall 28c. In some embodiments, the guide member 49 is integrally formed with the inner surface 32c of the sidewall 28c as a one piece monolithic structure with the sidewall 28c. In other embodiments, the guide member 49 may be coupled to the inner surface 32c of the sidewall 28c via a fastener, such as, without limitation, screws, rivets, bolt and nuts, adhesive, epoxy, weld, and/or the like.

In some embodiments, the guide member 49 may include an interior surface 51a and an opposite exterior surface 51b. In some embodiments, the exterior surface 51b may have a smooth contour. In other embodiments, the exterior surface 51b (CHANGED FROM may include a liner or other material to form the smooth contour. The guide member 49 may be circular in shape. In other embodiments, the guide member 49 may be other shapes such as square, rectangular, hexagonal, octagonal, and/or the like.

Figure 6:
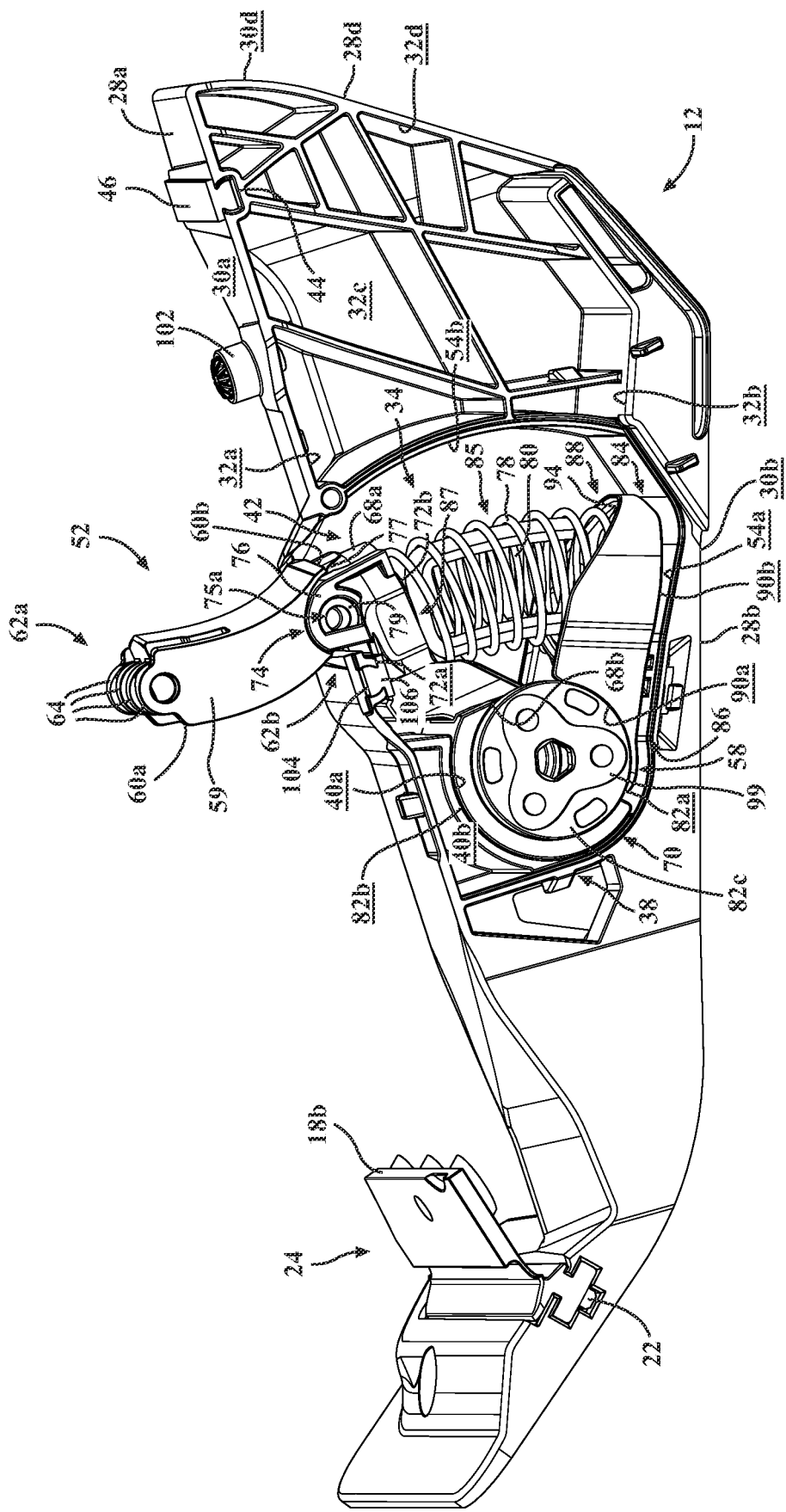
FIG. 6 schematically depicts a right side view of the pedal assembly of FIG. 1 with a connector assembly housing and a pedal arm removed according to one or more embodiments shown and described herein.
Figure 7:
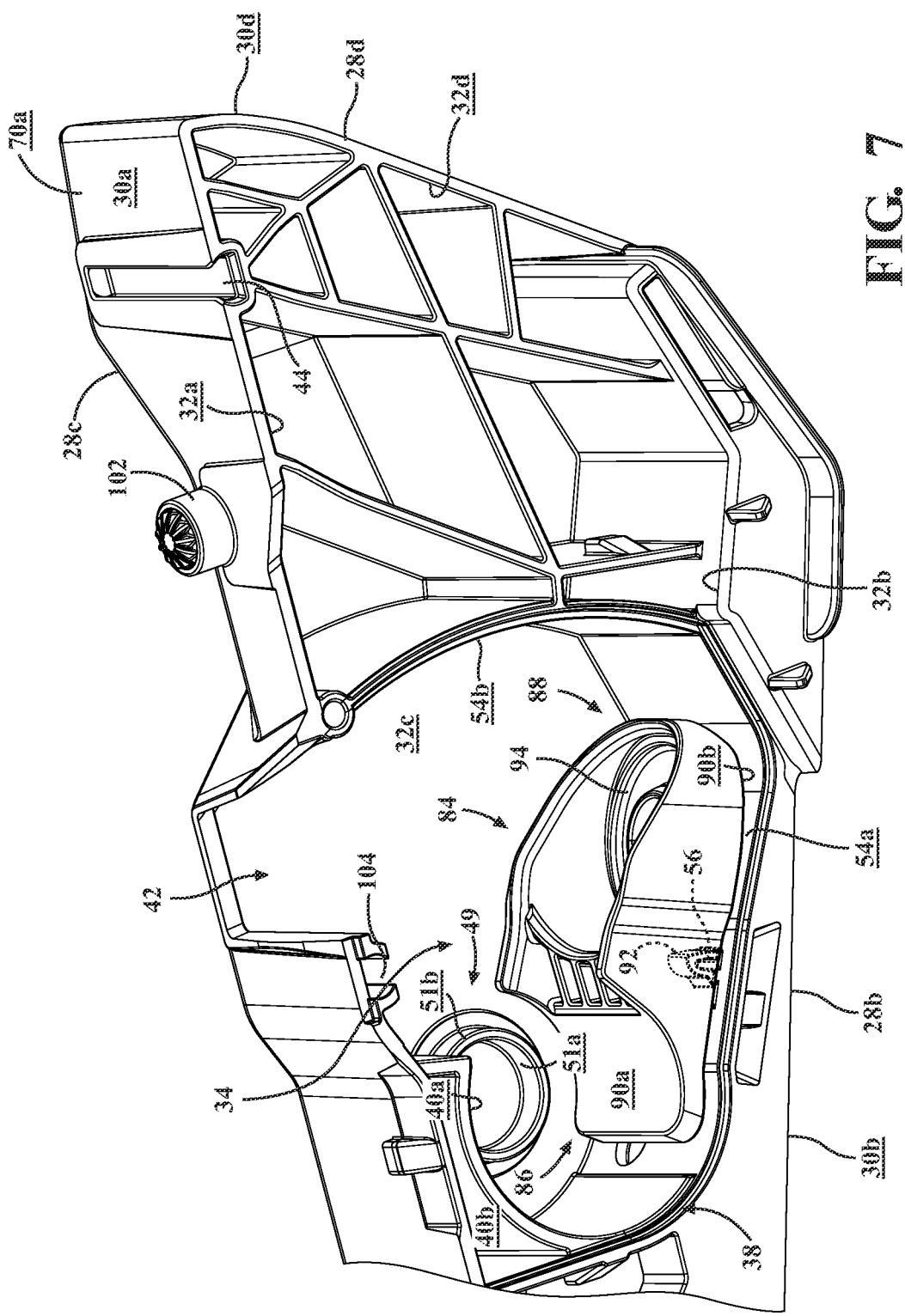
FIG. 7 schematically depicts the right side view of the pedal assembly of FIG. 6 with a lever arm and a pair of springs further removed according to one or more embodiments shown and described herein.
Figure 8:
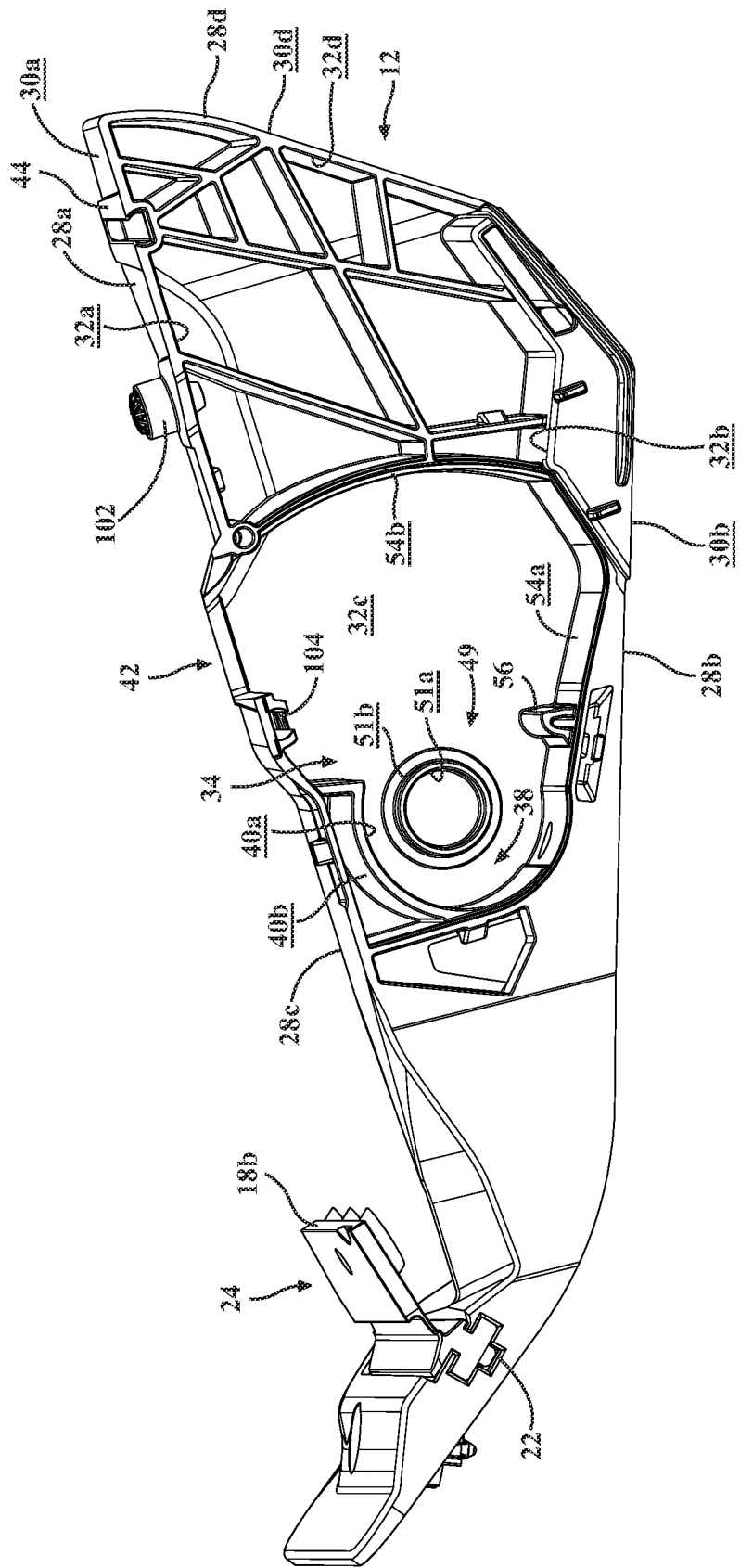
FIG. 8 schematically depicts the right side view of the pedal assembly of FIG. 6 illustrating a sidewall and frictions generating member of the housing according to one or more embodiments shown and described herein.

Still referring to FIGS. 1-10, the upper wall 28a further includes an opening 42 and a receiving channel 44 positioned within the outer surface 30a for receiving a damper 46 or bumper stop. The damper 46 or bumper stop may be an elastic material, rubber, and the like, and configured to cushion and provide an end of travel of the pedal arm 16 when in the fully depressed position. Further, the damper 46 or bumper stop may be slidably engaged within the receiving channel 44 to lock or retain the damper 46 or stop within the receiving channel 44. The opening 42 provides access to the cavity 34 of the housing 12. Further, in some embodiments, the inner surface 32a of the upper wall 28a may include a receiving channel 104 for receiving a damper 106 or bumper stop. The damper 106 or bumper stop may be an elastic material, rubber, and the like, and may be configured to cushion the lever arm 66 when the pedal arm 16 is in the home position, as best illustrated in FIG. 6. That is, the damper 106 may be configured to engage or abut with a surface of the lever arm 66 when the pedal arm is in the home position to reduce noise, vibration, and/or harshness. Further, the damper 106 or bumper stop may be slidably engaged within the receiving channel 104 to lock or retain the damper 106 or stop within the receiving channel 104.

The cavity 34 may be defined by a floor surface 54a, a terminating cavity wall surface 54b, and the friction generating member 38 such that the friction generating member 38 extends between and from the floor surface 54a and/or the inner surface 32b of the upper wall 28a on one end of the cavity 34 and the terminating cavity wall surface 54b is positioned at the opposite end with the floor surface 54a therebetween. A protrusion 56 extends from the floor surface 54a. In some embodiments, the protrusion 56 may be formed as a one piece monolithic structure with the floor surface 54a. In other embodiments, the protrusion 56 may be coupled or otherwise attached to the floor surface 54a via a fastener such as bolts and nuts, screws, rivets, adhesive, epoxy, weld, and/or the like. The protrusion 56 may be configured to hold a spring carrier assembly 58 in position within the cavity 34, as discussed in greater detail herein.

In some embodiments, a damper 102 may extend from the outer surface 30a of the upper wall 28a. The damper 102 may be configured to engage or otherwise makes contact with the plate spring 100 of the pedal arm 16 when the pedal arm is in or near the fully depressed position, as best illustrated in FIG. 4. As such, interaction of the damper 102 and the plate spring 100 may provide a desirable feel to the user when advancing the pedal arm 16 to the fully depressed position.

In some embodiments, the housing 12 may be a molded plastic. For example, the housing 12 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, thermoplastic vulcanizate, polysulfone, combinations thereof, and/or the like. Additionally, additives may be added such as UV absorbers, flame-retardants, colorants, glass fibers, plasticizers and/or the like.

In other embodiments, the housing 12 may be additively manufactured. Additively manufactured refers generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The housing 12 may be floor mounted. That is, in some embodiments, the housing 12 may be coupled or mounted to be positioned within or extending from a floor surface of a vehicle. As such, the cavity 34 of the housing accommodates the pedal arm 16 at full depression to allow the pedal arm 16 to fully travel between the home position, as best illustrated in FIGS. 1-2, and the fully depressed position, as best illustrated in FIGS. 3-4.

Still referring to FIGS. 1-10, the link member 52 includes a proximate end 60a and an opposite distal end 60b and an elongated member 59 therebetween. The elongated member 59 may be arcuate or curvilinear in shape. This is non-limiting and the elongated member 59 may be linear. The proximate end 60a includes a pedal attachment portion 62a and the distal end 60b includes a lever arm attachment portion 62b. The pedal attachment portion 62a may include a plurality of spaced apart flanges 64 that extend from the proximate end 60a. Each of the plurality of spaced apart flanges 64 correspond to the pair of spaced apart flanges 50a, 50b of the attachment portion 48 such that the plurality of spaced apart flanges 64 are coupled to the pair of spaced apart flanges 50a, 50b. In some embodiments, the coupling of the plurality of spaced apart flanges 64 to the pair of spaced apart flanges 50a, 50b may be by a snap-fit configuration. In other embodiments, the coupling of the plurality of spaced apart flanges 64 to the pair of spaced apart flanges 50a, 50b is via a fastener such as a screw, rivet, pin, bolt and nut, adhesive, epoxy, weld, and/or the like.

The lever arm attachment portion 62b includes a receiving cavity 77 and a coupling portion 79. The coupling portion 79 may include a tubular portion 89 or shape that is received by the lever arm 66, as discussed in greater detail herein.

In some embodiments, the link member 52 may be a molded plastic. For example, the link member 52 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, thermoplastic vulcanizate, polysulfone, combinations thereof, and/or the like. Additionally, additives may be added such as UV absorbers, flame-retardants, colorants, glass fibers, plasticizers and/or the like. In other embodiments, the link member 52 may be additively manufactured. In other embodiments, the link member 52 may be formed from a metal material such as steel, iron, copper, aluminum, alloys, combination thereof, and/or the like.

Still referring to FIGS. 1-10, the lever arm 66 includes a first end 68a and an opposite second end 68b. The second end 68b includes a hub portion 70. The first end 68a includes an interior surface 72a and an opposite exterior surface 72b. An attachment portion 74 extends from the exterior surface 72b of the first end 68a such that the attachment portion 74 is coupled to the lever arm attachment portion 62b of the distal end 60b of the link member 52. The attachment portion 74 includes a pair of spaced apart flanges 76 that each include an aperture 75a, 75b configured to receive the coupling portion 79 to couple the attachment portion 74 of the lever arm 66 to the lever arm attachment portion 62b of the link member 52. In other embodiments, the coupling of the attachment portion 74 of the lever arm 66 to the lever arm attachment portion 62b of the link member 52 is via a fastener such as a screw, rivet, pin, bolt and nut, adhesive, epoxy, weld, and/or the like.

A spring receiving recess 87 is positioned at and extends within the interior surface 72a of the first end 68a of the lever arm 66. The spring receiving recess 87 is positioned to receive at least one spring. In the illustrated embodiment, the at least one spring is a pair of springs, with the at least one spring depicted as an outer spring 78, an inner spring 80 positioned within an inner diameter ID1 of the at outer spring 78, and a damper 85 that has an outer diameter OD1 smaller or less than the inner diameter ID1 of the outer spring 78 such that the damper 85 may be positioned within the inner diameter ID1 of the at outer spring 78. The damper 85 may have an inner diameter ID2 that is larger than the outer diameter OD2 of the inner spring 80 such that the inner spring 80 is received within the inner diameter ID2 of the damper 85. As such, the spring receiving recess 87 receives a first terminating end 79a of the outer spring 78 and a first terminating end 81a of the inner spring 80, as discussed in greater detail herein.

The hub portion 70 includes a first surface 82a that is generally circular in shape and includes an end wall 82c, and an opposite receiving cavity 82d that is configured to receive the guide member 49 of the sidewall 28c, and a second surface 82b. As such, the receiving cavity 82d is generally shaped and sized to receive the guide member 49. The first surface 82a has a diameter D1. The second surface 82b extends from portions of the first surface 82a to partially overlap, abut, and/or cover portions of the first surface 82a. The second surface 82b follows the contour or geometric shape of the first surface 82a for the portions of the first surface 82a that the second surface 82b partially overlaps, abuts, and/or covers. As such, the second surface 82b extends from the first surface 82a as a single monolithic structure with the first surface 82a. The second surface 82b is arcuate in shape to match or correspond to the shape of the friction generating member 38. As such, the second surface 82b may be arcuate, semi-circular, semi-annular, and/or the like. The second surface 82b has second diameter D2 (e.g., length across the hub portion as best illustrated in FIG. 9A), which is a larger diameter (e.g., length) than the first diameter D1 (e.g., length) of the first surface 82a, at least in the positions where the second surface extends from the first surface 82a (e.g., the first surface 82a has a smaller diameter than the second surface 82b).

The second surface 82b abuts the interior surface 40a of the friction generating member 38. When the second surface 82b moves, such as by rotation, against the interior surface 40a of the friction generating member 38, a hysteresis is generated, as discussed in greater detail herein. Further, the guide member 49 guides the hub portion 70 during the movement of the hub portion 70 (e.g., the second surface 82b against the interior surface 40a of the friction generating member 38). As such, in operation, when a load is applied to the pedal arm 16 (as best illustrated as L1 in FIGS. 3, 4 and 10), the link member 52 applies a load onto the first end 68a of the lever arm 66, which in turn moves the hub portion 70 such that the second surface 82b moves against the interior surface 40a of the friction generating member 38 to generate the hysteresis, as discussed in greater detail herein.

In some embodiments, the lever arm 66 may be a molded plastic. For example, the lever arm 66 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, thermoplastic vulcanizate, polysulfone, combinations thereof, and/or the like. Additionally, additives may be added such as UV absorbers, flame-retardants, colorants, glass fibers, plasticizers and/or the like. In other embodiments, the lever arm 66 may be additively manufactured. In other embodiments, the lever arm 66 may be formed from a metal material such as steel, iron, copper, aluminum, alloys, combination thereof, and/or the like.

Still referring to FIGS. 1-10, the spring carrier assembly 58 includes the outer spring 78, the inner spring, a spring carrier 84, and the damper 85. The spring carrier 84 includes a concave portion 86 and a spring retaining portion 88 in an upper surface 90a and a recess 92 positioned in a lower surface 90b. The recess 92 may slidably receive the protrusion 56 extending from the floor surface 54a to lock or retain the spring carrier 84 onto the floor surface 54a of the cavity 34 of the housing 12. The concave portion 86 is radiused to match the radius of the first surface 82a of the hub portion 70 such that the concave portion 86 is configured to receive the first surface 82a. As such, the first surface 82a abuts the upper surface at the concave portion 86 of the spring carrier 84. It should be understood that the second surface 82b abuts the interior surface 40a of the friction generating member 38 and the first surface 82a (e.g., portions of the first surface 82a where the second surface 82b does not extend from the first surface 82a). As such, when the load is applied to the pedal arm 16, the lever arm 66 leverages the load applied to the pedal arm 16 to move the first surface 82a of the hub portion 70 against and/or within the concave portion 86 of the spring carrier 84. As such, the hub portion 70 rotates within the concave portion 86 of the spring carrier 84.

The spring retaining portion 88 includes a recess 94 that is configured to receive a second terminating end 81b of the inner spring 80 and a second terminating end 79b of the outer spring 78. As such, the outer spring 78, the inner spring 80, and the damper 85 extend linearly in the direction between the lever arm 66 and the spring carrier 84 and the outer spring 78 and the inner spring 80 extend between and in contact with the lever arm 66 and the spring carrier 84. Each of the outer spring 78 and the inner spring 80 may compress between the recess 94 of the spring retaining portion 88 of the spring carrier 84 and the spring receiving recess 87 of the lever arm 66. In some embodiments, the outer spring 78 and the inner spring 80 may each be formed from a stainless steel, wire, carbon steel, alloy steel, Elgiloy, Monel®, copper, nickel, combinations thereof, and/or the like. In other embodiments, the outer spring 78 and the inner spring 80 may be formed from composite materials. Further, the outer spring 78 and the inner spring 80 may be formed from different material or may be formed from the same material. Further, each of the outer spring 78 and the inner spring 80 may be formed to have different potential energy.

In some embodiments, the spring carrier 84 may be a molded plastic. For example, the spring carrier 84 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, thermoplastic vulcanizate, polysulfone, combinations thereof, and/or the like. Additionally, additives may be added such as UV absorbers, flame-retardants, colorants, glass fibers, plasticizers and/or the like. In other embodiments, the spring carrier 84 may be additively manufactured. In other embodiments, the spring carrier 84 may be formed from a metal material such as steel, iron, copper, aluminum, alloys, combination thereof, and/or the like.

Further, in some embodiments, the damper 85 may be a molded plastic. For example, the damper 85 may be formed with various materials such as acrylonitrile butadiene styrene (ABS), polyethylene (PE), polypropylene (PP), polycarbonate (PC), nylon, polycarbonate/acrylonitrile butadiene styrene, polyurethane, polymethyl methacrylate, high density polyethylene, low density polyethylene, polystyrene, PEEK, POM (Acetal/Delrin), polyethylene terephthalate, thermoplastic elastomer, polyetherimide, thermoplastic vulcanizate, polysulfone, combinations thereof, and/or the like. Additionally, additives may be added such as UV absorbers, flame-retardants, colorants, glass fibers, plasticizers and/or the like. In other embodiments, the damper 85 may be additively manufactured. In other embodiments, the damper 85 may be formed from a metal material such as steel, iron, copper, aluminum, alloys, combination thereof, and/or the like.

A connector assembly 107 is positioned on and extending from the connector assembly housing 36. The connector assembly 107 may include a connector 108, a plurality of terminals 110 positioned therein, and a circuit board 97, to communicatively couple the pedal assembly 10 to other components of a vehicle such as an electronic control module and/or a powertrain controller. In some embodiments, the connector assembly housing 36 and/or portions of the connector assembly 107 and/or the sensor assembly 96 may be formed from an overmold material. The circuit board 97 may be a printed circuit board, flexible circuit board, and/or the like.

The circuit board 97 may include at least one transmitter coil 98a and at least one receiver coil 98b. The sensor assembly 96 may further include a coupler 99 that may be mounted or attached to the end wall 82c of the hub portion 70 of the lever arm 66. As such, the coupler 99 may be positioned adjacent to the at least one receiver coil 98b and/or at least one transmitter coil 98a. In some embodiments, the coupler 99 may include distinct lobes, 112, such as three lobes as illustrated in FIG. 10. The coupler 99 may rotate or pivot upon movement of the hub portion 70 of the lever arm 66 when the load applied onto the pedal arm 16 moves the link member 52, which in turn moves the lever arm 66, thereby rotating the hub portion 70. In some embodiments, an outermost portion of each lobe 112 is positioned within an outer diameter of the at least one transmitter coil 98a and the at least one receiver coil 98b is positioned within the outer diameter of the at least one transmitter coil 98a. This is non-limiting and the outermost portion of each lobe 112 may be positioned outside of the outer diameter of the at least one transmitter coil 98a and/or portions of the at least one receiver coil 98b may be positioned outside of the outer diameter of the at least one transmitter coil 98a.

The at least one receiver coil 98b and the at least one transmitter coil 98a detect the movements of the coupler 99 and that data is transmitted to an ECU and/or powertrain controller communicatively coupled to the sensor assembly 96 via the connector 108. The sensor assembly 96 may include overmould to encapsulate the electronic components, and it may include solderless connections between PWA and terminal pins, such as compliant through-hole pins.

It should now be understood that the embodiments described herein are directed to a pedal assembly configured to generate its own hysteresis within a housing using a hub portion of a lever arm that moves against a corresponding semi-circular friction generating member that extends from an interior surface of a sidewall of the housing to generate hysteresis based on the amount of pivot of the pedal arm.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedal assembly comprising:
a housing having a cavity defined by an interior surface, a friction generating member is fixedly extending from a portion of the interior surface;
a pedal arm movably coupled to the housing; and
a lever arm in communication with the pedal arm, the lever arm having a hub portion positioned within the cavity such that portions of the hub portion abut the friction generating member of the housing, the hub portion configured to move when a force is applied to the pedal arm;
wherein when the pedal arm is moved, the lever arm leverages a load applied to the pedal arm to move at least a portion of the hub portion against the friction generating member of the housing thereby generating a hysteresis.

2. The pedal assembly of claim 1, wherein the friction generating member is integrated with a sidewall of the housing as a single structure.

3. The pedal assembly of claim 1, wherein the friction generating member is arcuate in shape.

4. The pedal assembly of claim 3, wherein the hub portion includes a first surface and a second surface, the second surface is semi-circular in shape to correspond to the arcuate shape of the friction generating member.

5. The pedal assembly of claim 4, wherein when the pedal arm is moved, the lever arm leverages the load applied to the pedal arm to move the second surface of the hub portion such that at least a portion of the second surface engages against the friction generating member of the housing thereby generating the hysteresis.

6. The pedal assembly of claim 4, wherein the first surface of the hub portion is circular in shape and the first surface has a smaller diameter than the second surface.

7. The pedal assembly of claim 4, wherein the second surface extends from a portion of the first surface, the first surface of the hub portion being circular in shape.

8. The pedal assembly of claim 4, further comprising:
a spring carrier assembly positioned within the cavity of the housing, the spring carrier assembly including:
a spring carrier having a spring receiving portion and a concave portion; and
at least one spring extending between the lever arm and the spring receiving portion,
wherein when the pedal arm is moved, the lever arm leverages the load applied to the pedal arm to move at least a portion of the first surface of the hub portion to be in communication with a portion of the concave portion.

9. The pedal assembly of claim 8, wherein the lever arm further comprises:
a spring receiving recess positioned at an interior surface of a first lever end of the lever arm, the spring receiving recess configured to receive another end of the at least one spring such that the at least one spring extends between the spring receiving recess of the lever arm and the spring receiving portion of the spring carrier.

10. The pedal assembly of claim 1, further comprising:
a sensor assembly having:
a coupler rotatably mounted to the hub portion;
at least one receiver coil positioned adjacent to the coupler; and
at least one transmitter coil,
wherein movement of the coupler is detected by the at least one receiver coil.

11. The pedal assembly of claim 1, wherein the hysteresis generated is proportional to the load applied to the pedal arm.

12. A floor mounted pedal assembly for a vehicle comprising:
a housing having a cavity defined by an interior surface, a friction generating member integrated with and is fixedly extending from a portion of the interior surface, the friction generating member being arcuate in shape;
a pedal arm movably coupled to the housing;
a lever arm in communication with the pedal arm, the lever arm having a hub portion positioned within the cavity such that portions of the hub portion abut the friction generating member of the housing, the hub portion configured to move when a force is applied to the pedal arm; and
a spring carrier assembly positioned within cavity of the housing, the spring carrier assembly including:
a spring carrier having a spring receiving portion; and
at least one spring extending between the lever arm and the spring carrier,
wherein when the pedal arm is moved, the lever arm leverages a load applied to the pedal arm to move at least a portion of the hub portion against the friction generating member of the housing thereby generating a hysteresis.

13. The floor mounted pedal assembly of claim 12, wherein:
the lever arm further includes a spring receiving recess positioned at an inner surface of a first lever end;
the at least one spring further includes a pair of terminating ends, one of the pair of terminating ends received in the spring receiving recess and the other one of the pair of terminating ends received in the spring receiving recess of the lever arm.

14. The floor mounted pedal assembly of claim 12, wherein the hub portion includes a first surface and a second surface, the second surface is semi-circular in shape to correspond to the arcuate shape of the friction generating member.

15. The floor mounted pedal assembly of claim 14, wherein when the pedal arm is moved, the lever arm leverages the load applied to the pedal arm to move the second surface of the hub portion such that at least a portion of the second surface engages against the friction generating member of the housing thereby generating the hysteresis.

16. The floor mounted pedal assembly of claim 14, wherein the first surface of the hub portion is circular in shape and the first surface has a smaller diameter than the second surface.

17. The floor mounted pedal assembly of claim 14, wherein the second surface of the hub portion extends from a portion of the first surface, the first surface of the hub portion being circular in shape.

18. The floor mounted pedal assembly of claim 14, wherein the spring carrier further comprises:
a concave portion,
wherein when the pedal arm is moved, the lever arm leverages the load applied to the pedal arm to move a portion of the first surface of the hub portion to be in communication with a portion of the concave portion.

19. The floor mounted pedal assembly of claim 12, further comprising:
   a sensor assembly having:
      a coupler rotatably mounted to the hub portion;
      at least one receiver coil positioned adjacent to the coupler; and
      at least one transmitter coil,
   wherein movement of the coupler is detected by the at least one receiver coil.

20. A pedal assembly comprising:
   a housing having a cavity defined by an interior surface, a friction generating member is fixedly extending from a portion of the interior surface, the friction generating member being arcuate in shape;
   a pedal arm movably coupled to the housing; and
   a lever arm in communication with the pedal arm, the lever arm having a hub portion positioned within the cavity, the hub portion having a first surface and a second surface, the second surface extends from a portion of the first surface, the second surface is semi-circular in shape to correspond to the arcuate shape of the friction generating member, at least portions of the second surface configured to abut the friction generating member of the housing and is configured to move when a force is applied to the pedal arm,
   wherein when the pedal arm is moved, the lever arm leverages a load applied to the pedal arm to move at least portions of the second surface of the hub portion against the friction generating member of the housing thereby generating a hysteresis.

* * * * *